April 5, 1966  L. J. JOHNSON  3,244,345
APPARATUS FOR WELDING THE INNERMOST WRAP OF A COIL
Filed May 25, 1964  2 Sheets-Sheet 1
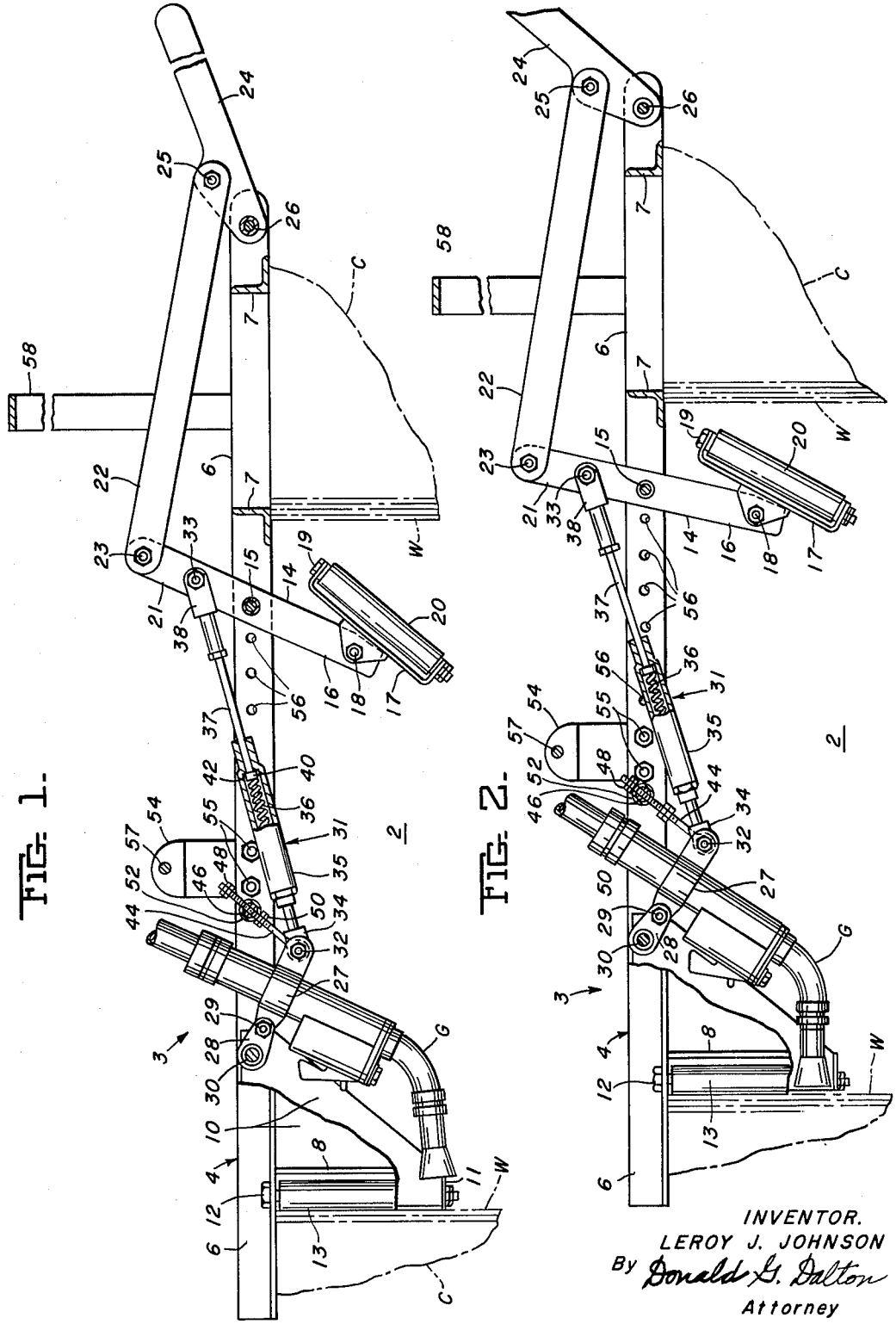
INVENTOR.
LEROY J. JOHNSON
By Donald G. Dalton
Attorney

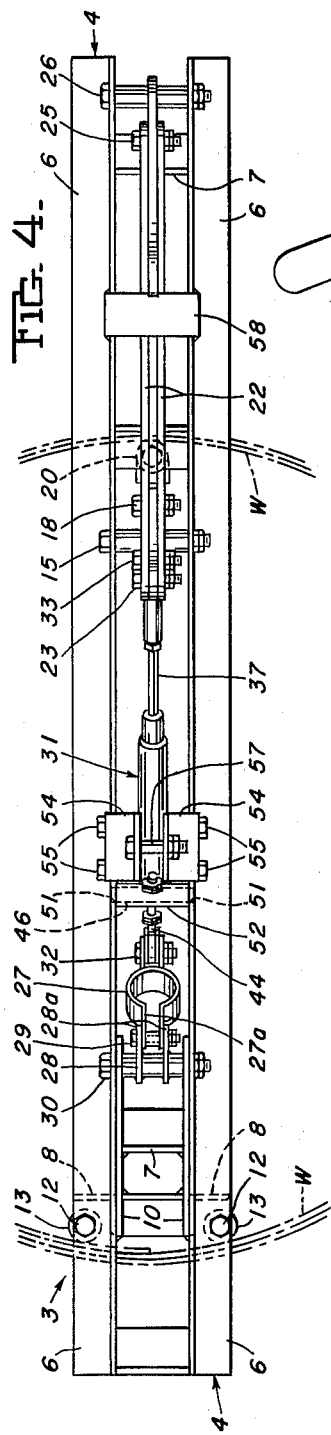

United States Patent Office 3,244,345
Patented Apr. 5, 1966

3,244,345
APPARATUS FOR WELDING THE INNERMOST
WRAP OF A COIL
Leroy J. Johnson, Center Township, Porter County, Ind., assignor to United States Steel Corporation, a corporation of New Jersey
Filed May 25, 1964, Ser. No. 369,978
12 Claims. (Cl. 228—44)

This invention relates to apparatus for spot-welding the innermost wrap of a coil of metal strip to the wrap adjacent thereto in order to prevent the coil from unwinding while it is being handled or stored.

The usual way of preventing a coil of strip from unwinding is to bind the coil with steel straps that extend through the central opening of the coil and around the outermost wrap thereof. This operation is costly and time-consuming. Attempts have been made to secure the inner and outer wraps of the coil by other means, such as spot-welding the ends of these wraps to the wraps adjacent thereto. However, these attempts have not been commercially successful in the past, because of the difficulty in holding the innermost wrap tight against the rest of the coil. Thus the welder could not quickly complete a satisfactory spot weld.

It is therefore an object of my invention to provide apparatus that will hold tight the innermost wrap of a coil while it is being welded, and will enable a welder to accomplish a satisfactory spot weld on the end of this wrap quickly and easily.

The attainment of this and other objects will appear more readily from the following description thereof and the attached drawings in which:

FIGURE 1 is a side elevation, partly in section, of apparatus for welding the innermost wrap of a coil, showing in their retracted positions both the welding gun and the means for holding tight the innermost coil wrap;

FIGURE 2 is a view, similar to FIGURE 1, showing the welding gun in proper position for welding the end of the innermost coil wrap and showing still retracted the means for holding tight the innermost wrap;

FIGURE 3 is a view, similar to FIGURE 1, showing both the welding gun and the means for holding tight the innermost coil wrap in their proper positions for welding; and FIGURE 4 is a top view of the apparatus of FIGURE 3, but with the welding gun not shown.

In FIGURE 1, a coil C is positioned on a platform (not shown) with the axis of its central opening 2 running vertically. Welding apparatus 3 includes a main frame 4 which rests on top of coil C and bridges the central opening 2 along one of the coil diameters.

Main frame 4 comprises two long steel angles 6, and a number of short steel angles 7 extending between and welded to angles 6. Two legs 8, in the form of steel angles, are attached to and extend downwardly from the angles 6 adjacent the left or front end thereof. Legs 8 are reinforced by bracket supports 10 (FIGURE 1) and are equipped with bottom plates 11. Each leg 8 has a bolt 12 fastened between one of the long angles 6 of main frame 4 and one of the plates 11. Rotatable around each bolt 12 is a front roller 13 for bearing against the innermost coil wrap W.

On the rear end of frame 4, a lever 14 is pivotally mounted between the long angles 6 by means of a bolt 15. Lever 14 has a lower portion 16 below bolt 15 depending into the central opening 2 of coil C. A U-shaped bracket 17 is pivotally attached to the lower end of lever 14 by means of a bolt 18. A bolt 19 extends between and is supported by the legs of bracket 17. Rotatably mounted around bolt 19 is a rear roller 20 for bearing against the wrap W at a position diametrically opposed to front rollers 13.

Lever 14 has an upper portion 21 above bolt 15, to which a link 22 is pivotally connected by a bolt 23. On its other end, link 22 is pivotally connected to a handle 24 by a bolt 25 and handle 24 is in turn pivotally attached by a bolt 26 to the rear end of main frame 4 between the long angles 6. Handle 24 can be rotated forward from its position in FIGURE 1 to move upper portion 21 of lever 14 forward, and thereby cause rear roller 20 to move rearward, as shown in FIGURE 2. An operator pressing forward on handle 24 will eventually cause front rollers 13 and the rear roller 20 to bear against opposite portions of inner coil wrap W, as shown in FIGURE 3, thereby holding this wrap tight against the other wraps of the coil C.

Towards the front of main frame 4 is mounted a welding gun G. The one shown is a model Ga–300 welding gun manufactured by Hobart Brothers Company of Troy, Ohio. The welding gun G is held by a clamp 27 around its main body, while the front end of the gun swings between front legs 8. Clamp 27 is pivotally attached to a link 28 by a bolt 29, and arms 27a of clamp 27 (FIGURE 4) fit between arms 28a of link 28 in such a manner that the welding gun is held tightly in clamp 27. Link 28 is pivotally connected between long angles 6 of frame 4 by a bolt 30. The double-jointed mounting of the welding gun G to frame 4, provided at bolts 29 and 30, gives the welder more freedom in positioning the gun during the welding operation than he would have with a single-pivot mounting. A main link 31 extends between clamp 27 and the upper portion 21 of lever 14 and is pivotally connected thereto by means of bolts 32 and 33, respectively. When handle 24 is in its most rearward position (FIGURE 1), main link 31 holds welding gun G back away from the end of coil wrap W. Link 31 is of variable length and, as shown in FIGURE 1, includes a clevis 34 pivotally connected to the bolt 32, a cylinder 35 housing a spring 36, a plunger rod 37, and a clevis 38 pivotally connected to the bolt 33. Plunger rod 37 is slidable within cylinder 35 and has a head 40 therein which bears against an inner bearing surface 42 of cylinder 35 when main link 31 is fully extended, as in FIGURE 1. When the link 31 is shortened as in FIGURE 3, the head 40 compresses spring 36.

The welding gun G is limited in its motion toward and away from the end of coil wrap W by a guide rod 44 pivoted about the same bolt 32 which connects clamp 27 to main link 31. Guide rod 44 slides through a hole in a pin 46 and has a threaded portion provided with adjustable stop nuts 48 and 50 on either side of pin 46. Pin 46 rotates in a pair of holes 51 in the vertical sides of long angles 6 of main frame 4. A sleeve 52, best seen in FIGURE 4, has a larger outside diameter than holes 51 and surrounds the pin 46. When guide rod 44 is passed through aligned holes in pin 46 and sleeve 52, the sleeve 52 keeps the pin 46, the rod 44 and the clamp 27 from moving laterally. Thus, the welding gun G held by clamp 27 is also restrained from lateral movement as it swings between front legs 8.

Suspension brackets 54 are attached by bolts 55 to the angles 6. A number of holes 56 are provided in the vertical sides of angles 6, and bolts 55 are inserted through the holes 56 closest to the center of gravity of apparatus 3. A bolt 57 is secured between brackets 54 and provides a means for hooking onto the apparatus 3 with a hoist to lower or raise the apparatus into or out of the central opening 2 of coil C. Near the rear of main frame 4, an inverted U-shaped member 58 is welded to angles 6 to provide a means for grasping the apparatus 3 when positioning the apparatus on the coil C and pointing the welding gun G toward the end of the innermost coil wrap W.

To weld the innermost wrap of coil C to the wrap adjacent thereto, the welder first lowers the apparatus 3 into the central opening 2 of coil C by means of a hoist, not shown, which is hooked to the bolt 57. The apparatus is lowered until the main frame 4 rests on the top of the coil. Meanwhile, the welder, grasping the U-shaped member 58, rotates the apparatus until welding gun G is pointing toward the end of the innermost wrap W. He then moves the handle 24 from the position shown in FIGURE 1 to the position shown in FIGURE 2. This causes upper portion 21 of lever 14 to be rotated forward, and plunger rod 37 to push on spring 36. The spring transmits this force to the cylinder 35 and the clevis 34 attached to the clamp 27 holding welding gun G. Thus welding gun G is swung forward to its position for welding the end of coil wrap W, shown in FIGURE 2. The spring 36 may be eliminated if clamp 27 is attached directly to angles 6 in such a manner that the welding gun G will swing forward into its welding position by the force of gravity. In this case, the head 40 of plunger rod 37 will hold welding gun G back away from coil wrap W when handle 24 is in the position shown in FIGURE 1. As the handle 24 is moved to the position of FIGURE 2, plunger rod 37 will move forward, allowing welding gun G to swing by gravity into its welding position.

When the gun G is in position for welding (FIGURE 2), the adjustable stop nuts 48 bearing against the top of sleeve 52 will prevent further movement of gun G toward coil wrap W. As handle 24 is pushed forward from the position of FIGURE 2 to cause rear roller 20 to bear against the rear portion of wrap W (FIGURE 3), plunger rod 37 will slide forward within cylinder 35, the latter being held stationary by the stop nuts 48 bearing against sleeve 52. If the cylinder 35 is provided with a spring 36, the spring will be compressed during this operation.

It will be seen in FIGURE 3 that when the welder rotates handle 24 forward as far as it will go, and maintains pressure thereon, the innermost wrap W will be held firmly against the adjacent wraps of coil C by front rollers 13 and rear roller 20. Also, the welding gun G will be in position for welding the end of wrap W, subject to small adjustments which the welder may easily make, owing to the double-jointed attachment of welding gun G to main frame 4 provided by link 28 and bolts 29 and 30. After the welder finishes the joining of the innermost wrap W to the adjacent winding, he pulls back on handle 24, causing first the withdrawal of rear roller 20, and then when the head 40 of plunger rod 37 reaches the bearing surface 42 inside cylinder 35, the withdrawal of welding gun G. This motion continues until stop nuts 50 on guide rod 44 bear against the bottom surface of sleeve 52. Then, welding gun G, and the rear roller 20 on the bottom of lever 14 will be back in their retracted positions shown in FIGURE 1, and the apparatus W will be ready to be hoisted away from coil C and moved on to another coil.

While I have thus illustrated and described my invention, modifications may of course be made without departing from the spirit of the invention, or the scope of the appended claims.

I claim:

1. Apparatus for holding a welding gun adjacent the innermost wrap of a coil of strip comprising, a main frame extending across the central opening of said coil, a front leg rigidly secured to said frame and extending into said central opening of the coil, a rear lever pivotally connected to said frame and having the lower portion thereof below said pivotal connection extending into said central opening, said leg and said lever each having bearing means attached thereto, said bearing means bearing against diametrically opposed portions of the innermost wrap of said coil when said lower portion of said lever is rotated rearward, means pivotally attached to said frame for holding said welding gun, said pivotally attached means being disposed to allow said gun to move into proper position for welding said innermost coil wrap to the wrap adjacent thereto, and means connected between said pivotally attached means and said lever for moving said welding gun toward said innermost wrap in response to the rearward movement of said lower portion of said lever.

2. The apparatus of claim 1 including means for limiting the forward movement of said welding gun toward said innermost wrap at said proper position of the gun for welding.

3. The apparatus of claim 2 wherein the means connected between said lever and said welding gun comprises a main link having sections slidable lengthwise over one another, said link being connected to the upper portion of said lever above its pivotal connection to said frame.

4. The apparatus of claim 3 wherein said main link has spring means connected between its said sections tending to expand its length.

5. The apparatus of claim 4 including means for making small adjustments in the position of said welding gun adjacent said innermost coil wrap, said last named means comprising a link extending between said main frame and said means for holding said welding gun, a pivotal connection between said link and said main frame, and a pivotal connection between said link and said means for holding said welding gun.

6. The apparatus of claim 1 wherein said means for bearing against oppositely disposed portions of said inner wrap includes rollers rotatably mounted on said leg and said lever with axes parallel with the axis of said coil.

7. Apparatus for welding the innermost wrap of a coil of strip to the wrap adjacent thereto comprising, a main frame extending across the central opening of said coil, a front leg rigidly secured to said frame and extending into said central opening of the coil, a rear lever pivotally connected to said frame and having the lower portion thereof extending into said central opening, said leg and said lever equipped with means for bearing against oppositely disposed portions of said innermost wrap of said coil when said lower portion of said lever is rotated rearward, a welding gun attached by a pivotal connection to said frame, said pivotal connection disposed so as to allow said gun to be moved into a proper position for welding said innermost wrap to the wrap adjacent thereto, and means connected between said lever and said welding gun for moving said gun toward said innermost wrap in response to the rearward movement of said lower portion of said lever.

8. The apparatus of claim 7 comprising means for limiting the forward movement of said welding gun toward said innermost wrap when said proper welding position is reached.

9. Apparatus for welding the innermost wrap of a coil of strip to the wrap adjacent thereto comprising, a main frame extending across the central opening of said coil, a front bearing means rigidly secured to said frame and extending into the central opening of said coil, a rear lever pivotally connected to said frame and having its lower portion extending into said central opening, a rear bearing means mounted on said lower portion of said lever, means for rotating said lower portion of said lever rearward and holding the respective bearing means on said leg and said lever against oppositely disposed portions of the innermost wrap of said coil, a welding gun attached by a pivotal connection to said frame, said pivotal connection disposed so as to allow said gun to be moved into a proper position for welding said innermost wrap to the wrap adjacent thereto, means for limiting the forward movement of said welding gun toward said innermost wrap at said proper position of the gun for welding, and a main link connected between said gun and the upper portion of said lever above where said lever is pivotally connected to said frame, said main link having sections which slide lengthwise over one another during the rearward movement of said lower portion of said lever after said welding gun has reached said proper welding position.

10. The apparatus of claim 9 wherein the pivotal connection between said welding gun and said frame comprises a link pivotally connected both to said frame and to said gun, and said main link has spring means connected between its said sections tending to expand its length.

11. The apparatus of claim 9 wherein said means for limiting the forward movement of said welding gun comprises a guide rod pivotally connected to said gun, a horizontal pin rotatably mounted on said frame and having a hole through its diameter, said guide rod extending through said hole in said pin and having a stop nut thereon for bearing against said pin to limit the forward movement of said guide rod and said gun.

12. Apparatus for holding a welding gun adjacent the innermost wrap of a coil of strip supported with the axis of its central opening generally vertical comprising a frame resting on top of said coil and extending across the coil opening, bearing means rigidly attached to said frame adjacent the front end thereof extending downwardly into said central opening, a rear lever pivotally connected to said frame and having one end extending downwardly into said central opening, bearing means supported on said one end of said lever, means for moving said lever about its pivot, said bearing means bearing against diametrically opposed portions of the innermost wrap of said coil when said lower portion of said lever is rotated rearward, means pivotally attached to said frame for holding said welding gun, said pivotally attached means being disposed to allow said gun to move into proper position for welding said innermost coil wrap to the wrap adjacent thereto, and means connected between said pivotally attached means and said lever for moving said welding gun toward said innermost wrap in response to the rearward movement of said lower portion of said lever.

References Cited by the Examiner

UNITED STATES PATENTS 1,846,470   2/1932   Brunish _____ 219—60

WHITMORE A. WILTZ, *Primary Examiner.*